(12) United States Patent
Gotanda

(10) Patent No.: US 6,678,832 B1
(45) Date of Patent: Jan. 13, 2004

(54) MEMORY CONTROLLER FOR CONTROLLING AN INTEGRATED MEMORY UNDERGOING LOGICAL STATE TRANSITIONS

(75) Inventor: Chikara Gotanda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/430,538

(22) Filed: Oct. 29, 1999

(30) Foreign Application Priority Data

Oct. 29, 1998 (JP) .......................................... 10-308172

(51) Int. Cl.⁷ ............................................... G06F 1/32
(52) U.S. Cl. ...................... 713/400; 713/323; 713/502; 713/601; 711/167; 327/141; 365/233
(58) Field of Search .................... 365/233; 711/103, 711/166, 167; 713/323, 400, 324, 500, 600, 502, 601; 327/141, 126; 363/95; 348/525; 345/98

(56) References Cited

U.S. PATENT DOCUMENTS

| | | | | |
|---|---|---|---|---|
| 5,157,492 A | * | 10/1992 | Tults | 348/526 |
| 5,615,376 A | | 3/1997 | Ranganathan | 713/322 |
| 5,696,977 A | | 12/1997 | Wells et al. | 713/322 |
| 5,696,978 A | * | 12/1997 | Nishikawa | 713/324 |
| 5,828,253 A | * | 10/1998 | Murayama | 327/156 |
| 5,917,350 A | * | 6/1999 | Graf, III | 327/141 |
| 6,005,789 A | * | 12/1999 | Lee | 363/95 |
| 6,023,770 A | * | 2/2000 | Miyake | 713/401 |
| 6,085,326 A | * | 7/2000 | Kim | 713/300 |
| 6,424,379 B1 | * | 7/2002 | Itabisashi | 348/525 |
| 2002/0011985 A1 | * | 1/2002 | Nakano et al. | 345/98 |

FOREIGN PATENT DOCUMENTS

| | | |
|---|---|---|
| JP | 06051861 | 2/1994 |
| JP | 07191954 | 7/1995 |
| JP | 07295956 | 11/1995 |
| JP | 08036499 | 2/1996 |
| JP | 10031530 | 2/1998 |
| JP | 10105275 | 4/1998 |

OTHER PUBLICATIONS

Yamazaki et al, "A Fully Synchronous Circuit Design for Embedded DRAM".*

* cited by examiner

Primary Examiner—Pierre-Michel Bataille
(74) Attorney, Agent, or Firm—RatnerPrestia

(57) ABSTRACT

A controller and a control method of an integrated memory provided in a system LSI used in television receiver or other video appliance are disclosed. In the memory controller of the invention, when a clock signal suspend command signal not synchronized with a synchronization signal is entered, a suspend command signal synchronized with the synchronization signal is generated. The clock signal supplied in the integrated memory is suspended according to a synchronized suspend command signal. Since the clock signal supply is suspended only while the integrated memory is in idling state, the power consumption of the system LSI can be saved without breaking down the integrated memory.

12 Claims, 5 Drawing Sheets

Reference Numerals

| | |
|---|---|
| 1 | Horizontal synchronization signal |
| 2 | Clock signal supply control signal |
| 3 | Memory operation command |
| 4 | Synchronized clock signal supply control signal |
| 5 | Select signal |
| 6 | POS start signal |
| 7 | POS command |
| 8 | Memory control signal |
| 10 | Operation command generating circuit |
| 20 | Control signal generating circuit |
| 30 | POS generating circuit |
| 40 | Command selector |
| 50 | Integrated memory |
| 55 | System LSI |
| 60 | Memory controller |
| 70 | Clock signal generating circuit |
| 80 | Clock signal cutoff circuit |
| 101 | Signal processing circuit |
| 102 | Control signal generating circuit |

MEMORY CONTROLLER FOR CONTROLLING AN INTEGRATED MEMORY UNDERGOING LOGICAL STATE TRANSITIONS

TECHNICAL FIELD

The present invention relates to a memory controller for saving power consumption by stopping clock signal in idling state of system LSI while preventing breakage of memory integrated in the system LSI.

PRIOR ART

In a logic LSI and a microcomputer, in order to save power consumption, it has been often proposed to stop clock signal while idling. The memory used in the logic LSI was mainly the SRAM which can be easily used together with other semiconductors. Basically, the SRAM is composed of flip-flops, and there was no problem if the clock signal is stopped while the LSI is idling.

Recently, owing to the progress in the semiconductor process technology, memories manufactured in different semiconductor processes such as a DRAM and a flash memory can be commonly integrated in one LSI. Since the integrated DRAM does not have a protective circuit for the integrated memory due to the scale limitation of the LSI, it is necessary to operate according to the procedure determined for controlling the DRAM. Therefore, in the system LSI incorporating the DRAM, stopping of clock signal for saving power requires a different method from the logic LSI or microcomputer having the SRAM.

FIG. 4 shows an example of clock signal stop control method in a signal processing circuit and a control signal generating circuit for controlling the signal processing circuit in a conventional video appliance. The conventional clock signal stop controlling method is explained below while referring to FIG. 4. A signal processing circuit 101, when receiving a horizontal synchronization signal 1, performs various signal processings on the basis of the horizontal synchronization signal 1. A control signal generating circuit 102, when receiving the horizontal synchronization signal 1, generates various control signals, including the control signal for the signal processing circuit 101 on the basis of the horizontal synchronization signal 1.

Inside of these two circuits, there is a clock signal control unit for stopping and restarting clock signal supply for signal processing and control signal generation. These circuits are composed of logic LSI and SRAM. In thus constituted conventional video appliance, the operation of clock signal stop control method of the signal processing circuit 101 and control signal generating circuit 102 is explained below.

The signal processing circuit 101 and control signal generating circuit 102 operate on the basis of the horizontal synchronization signal 1. Herein, when the signal processing circuit 101 and control signal generating circuit 102 receive a clock signal suspend command from a clock signal supply control signal 2 not synchronized with the horizontal synchronization signal 1, immediately responding to the command, the signal processing circuit 101 causes its clock signal control unit to stop the clock signal. Similarly, the control signal generating circuit 102 also stops its internal clock signal.

When the clock signal stops, the signal processing circuit 101 and control signal generating circuit 102 suspend their operation temporarily, and when a clock signal restart command is given by the clock signal supply control signal 2, the clock signal supply is restarted immediately responding to the command, and the operation is started again. Thus, by simply stopping the clock signal, the signal processing circuit 101 and control signal generating circuit 102 are set in idling state, and the power consumption is saved.

In the conventional clock signal stop control method, since the signal processing circuit and control signal generating circuit are composed of SRAM and logic circuit, no problem was caused even if the clock signal supply was stopped or restarted according to the clock signal supply control signal not synchronized with the horizontal synchronization signal.

However, in the case of LSI with an integrated memory having a logical state such as DRAM, when an asynchronous clock signal supply control signal ignoring the logical state of the memory is put into the LSI and the clock signal supply is stopped according to such signal, the memory cell may be broken down.

SUMMARY OF THE INVENTION

The clock signal stop controller of the invention, in case that a memory having a logical state is integrated in the LSI or the like used in video appliance, is characterized by stopping and restarting clock signal supply without breaking down the memory cell in the following procedure.

1) Receiving a clock signal supply control signal not synchronized with a horizontal synchronization signal which is used as the reference signal, a clock signal supply control signal synchronized with the horizontal synchronization signal is generated.

2) Corresponding to the synchronized clock signal supply control signal, the clock signal is stopped only in the idling state of the logical state of the integrated memory.

3) After restarting the clock signal supply according to the synchronized clock signal supply control signal, the integrated memory is initialized.

The memory controller of the invention has the following constituent elements for the purpose of controlling the clock signal supply to the memory.

a) An operation command generating circuit for generating an operation command for controlling the integrated memory on the basis of the input horizontal synchronization signal.

b) A control signal generating circuit for generating various control signals synchronized with the horizontal synchronization signal by receiving a clock signal supply control signal not synchronized with the horizontal synchronization signal.

c) A power-on sequence command generating circuit for generating a power-on sequence command according to a control signal from the control signal generating circuit.

d) A command selector for selecting either the output signal from the operation command generating circuit or the output signal from the power-on sequence command generating circuit, depending on the output signal from the control signal generating circuit, and outputting the selected signal to the integrated memory.

e) A clock signal cutoff circuit for cutting off the clock signal supplied from the clock signal generating circuit into the integrated memory according to the control signal from the control signal generating circuit.

In this constitution, the invention has the following features.

In the system LSI with an integrated memory, even if a clock signal suspend command signal is input by a clock signal supply control signal not synchronized with the horizontal synchronization signal, the clock signal supply is stopped always in the idling state of the integrated memory. Therefore, the invention can save power consumption by the clock signal stop function in the system LSI without breaking down the integrated memory.

DETAILED DESCRIPTION OF THE PREFERRED EMBODIMENT

Figure 2:
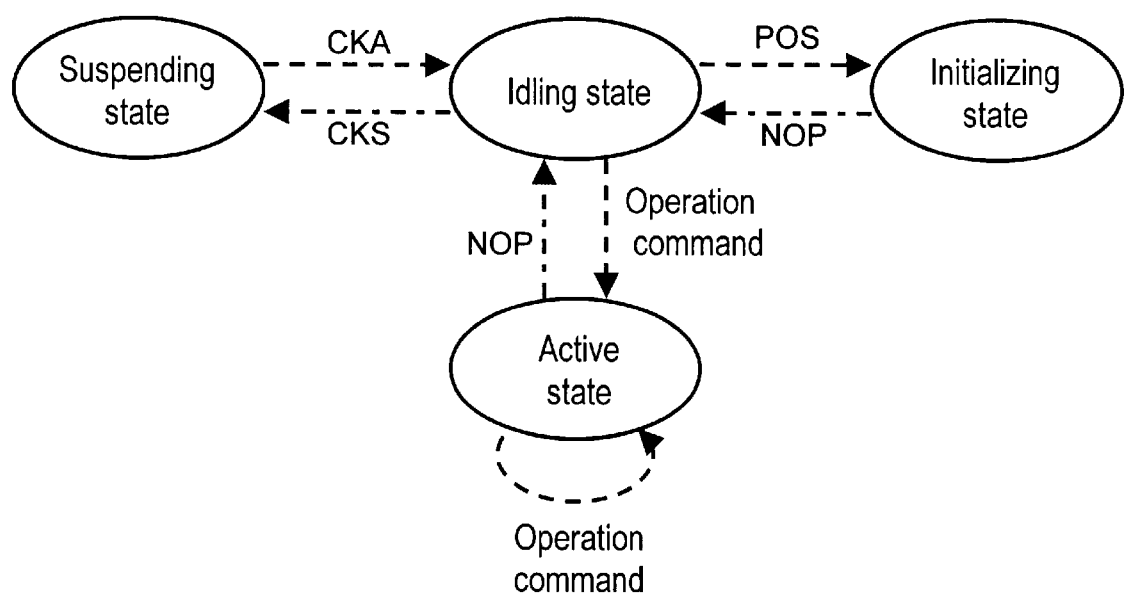
FIG. 2 is a logical state transition diagram of an integrated memory.

An embodiment of the invention is described by referring to the accompanying drawings. FIG. 2 is a logical state transition diagram of an integrated memory. Referring now to FIG. 2, the logical state transition of the memory when stopping and restarting clock signal supply to the integrated memory is described below.

1) As shown in FIG. 2, the logical state of the integrated memory includes an active state making operation such as data writing or reading, an idling state not making operation such as data writing or reading, a suspending state suspending the clock signal supply, and an initializing state for initializing.

2) In the transition from active state to suspending state, as indicated by single dot chain line in FIG. 2, the memory controller once sets the integrated memory in idling state by No Operation (NOP) command, and suspends the clock signal supply by suspend command signal CKS.

3) When the integrated memory is set back to active state, the state is changed as indicated by dotted line in FIG. 2. First, the integrated memory in suspending state is set to idling state by restarting clock signal supply by supply command signal CKA, and then the integrated memory is initialized by power-on sequence (POS) command. After completion of initialization, the integrated memory is set in idling state by NOP command. Afterwards, according to the initial operation command of the series of operation commands, the integrated memory is set in active state. The memory, in active state, performs ordinary operation such as data reading or writing according to the operation commands given successively.

Figure 1:
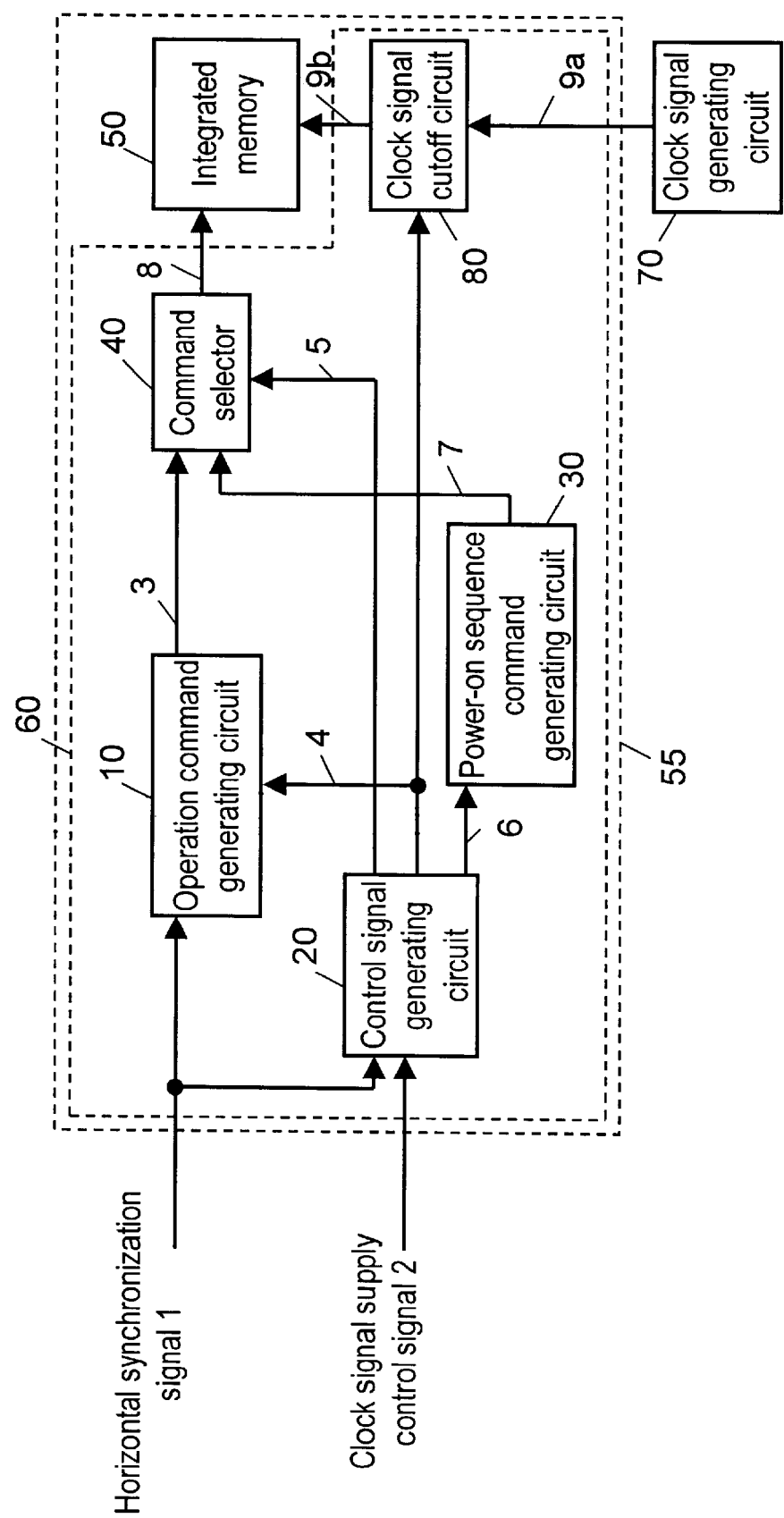
FIG. 1 is a block diagram of a memory controller in an embodiment of the invention.

The following is the description of memory controller and method of memory control for controlling the memory undergoing such logical state transition as mentioned above when starting or stopping the clock signal supply. In FIG. 1, a memory controller 60 of the invention comprises an operation command generating circuit 10, a control signal generating circuit 20, a power-on sequence command (POS) generating circuit 30, a command selector 40, and a clock signal cutoff circuit 80, and the memory controller 60 and integrated memory 50 are incorporated in a one-chip system LSI 55 together with CPU and other circuits.

The operation command generating circuit 10 generates a memory operation command 3 for controlling the active state of the integrated memory 50 on the basis of the input horizontal synchronization signal 1 as a reference signal.

The memory operation command 3 is output on the basis of the rise of the horizontal synchronization signal 1. The memory operation command 3 is composed of a NOP command for setting the integrated memory 50 in idling state and an operation command for making ordinary operation. The operation command 3 includes plural commands for causing the integrated memory 50 to read out and write in the data.

The control signal generating circuit 20 receives a clock signal supply control signal 2 not synchronized with the entered horizontal synchronization signal 1, and generates plural control signals synchronized with the horizontal synchronization signal 1. The plural control signals include synchronized clock signal supply control signal 4, select signal 5, and power-on sequence (POS) start signal 6. The synchronized clock signal supply control signal 4 is issued to the operation command generating circuit 10 and clock signal cut-off circuit 80. The select signal 5 is issued to the command selector 40. The power-on sequence (POS) start signal 6 is issued to the POS command generating circuit 30. The clock signal supply control signal 2 includes a clock signal suspend command signal CKS1 and a clock signal supply command signal CKA1. The synchronized clock signal supply control signal 4 includes a clock signal suspend command signal CKS2 and a clock signal supply command signal CKA2.

The POS command generating circuit 30 generates a POS command 7 on the basis of the rise of the POS start signal 6, and initializes the integrated memory 50. The command selector 40 changes over either the memory operation command 3 or POS command 7 depending on the select signal 5, and sends out a memory control signal 8 to the integrated memory. The integrated memory 50 operates according to the memory control signal 8, and is shifted to idling state by the input of NOP command.

The command selector 40 receives the output signal of the memory operation command generating circuit 10 and the output signal of the POS command generating circuit 30, and changes over two input signals and outputs one of them depending on the select signal 5.

Figure 3:
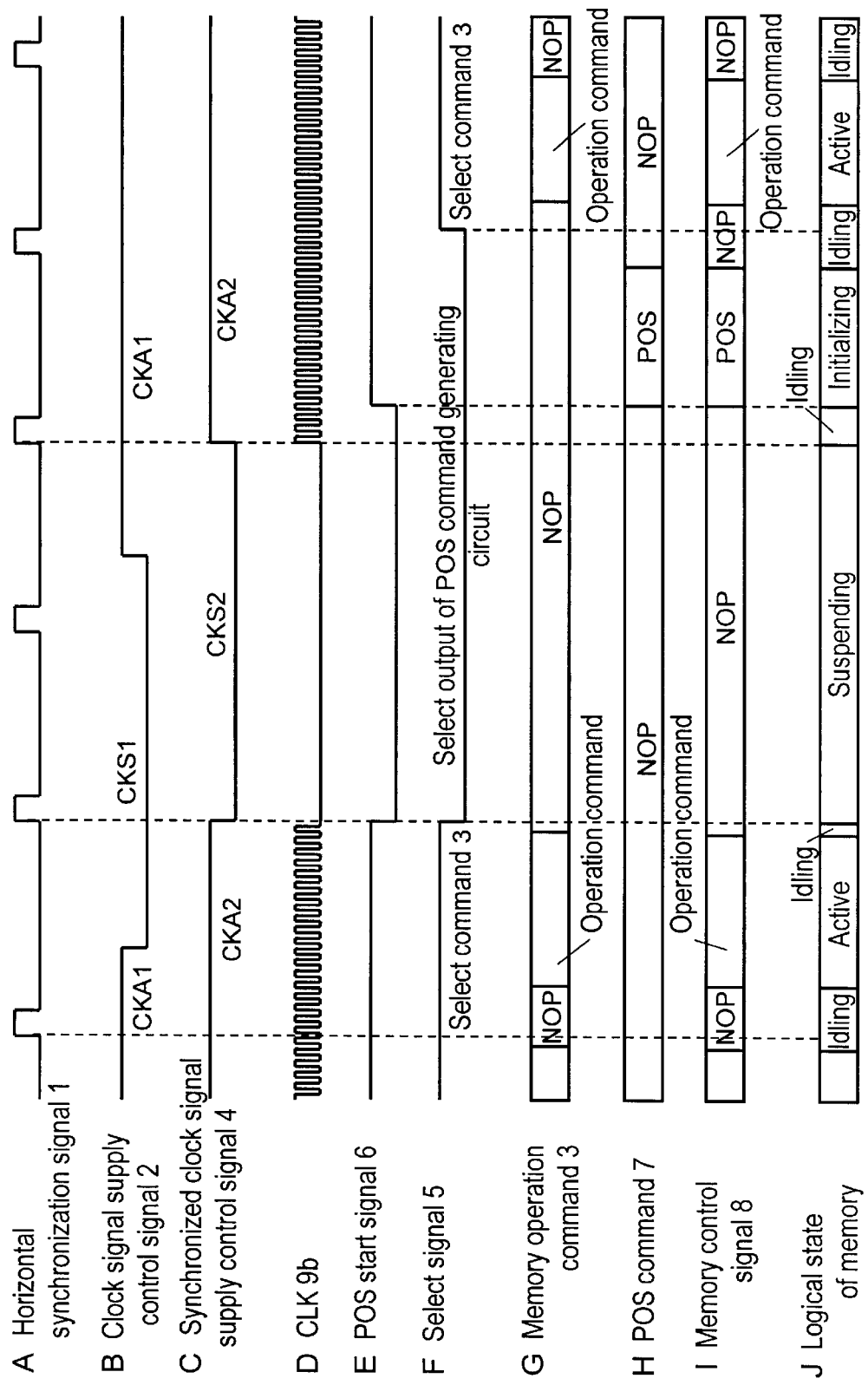
FIG. 3 is a time chart showing the relation between each signal and active state of the integrated memory when stopping and restarting clock signal supply.
Figure 4:
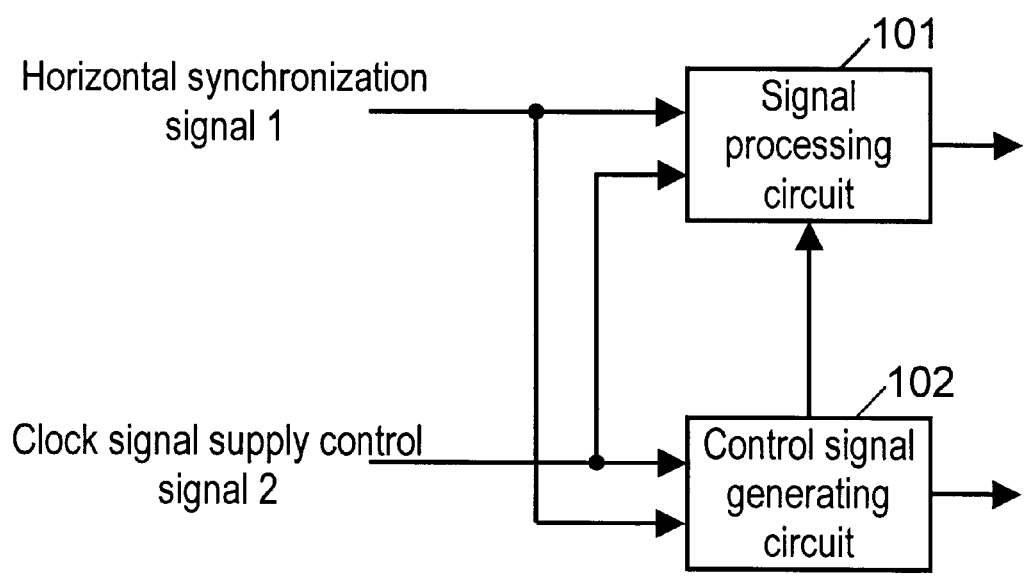
FIG. 4 shows an example of a circuit for executing a conventional clock signal stop control method.

The clock signal cutoff circuit 80 passes or cuts off the clock signal 9a issued from the clock signal generating circuit 70 provided outside of the system LSI 55 depending on the synchronized clock signal supply control signal 4, and issues a clock signal 9b to the integrated memory 50. The synchronized clock signal supply control signal 4 includes the clock signal supply command signal CKA2 for instructing the clock signal cutoff circuit 80 to supply the clock signal and the clock signal suspend command signal CKS2 for instructing that to cutoff the clock signal. The operation of the memory controller in FIG. 1 having such constitution is more specifically described below while referring to FIG. 3.

1) First, the operation in the active state is described.

In the active state, the clock signal supply command signal CKA1 is input as clock signal supply control signal 2, and the synchronized clock signal supply control signal 4 is the clock signal supply command signal CAK2 (FIG. 3C). Thus, the clock signal supply is supplied to the integrated memory (FIG. 3D). The command selector 40 is selecting the memory operation command 3 according to the select signal 5 (FIG. 3F). Therefore, the memory operation command 3 synchronized with the horizontal synchronization signal (FIG. 3A) is supplied into the integrated memory as memory control signal 8. The operation command generating circuit 10, when receiving the horizontal synchronization signal, issues an operation command after a specified time. It also issues a NOP command before start of output of operation command and after output of operation command (FIGS. 3G, I). Therefore, according to the NOP command, the integrated memory 50 is always in idling state before and after horizontal synchronization signal (FIG. 3J).

Successively to the NOP command, plural operation commands are issued sequentially, and the integrated memory operates as specified. Although omitted in the diagram, the operation command in FIG. 3G includes plural operation commands.

On the other hand, the power-on sequence command generating circuit 30 always issues NOP commands (FIG. 3H) because the input POS start signal 6 is in High state (FIG. 3E).

2) Next, the clock signal cutoff operation is described.

When the clock signal suspend command signal CKS1 is input at timing asynchronous to the horizontal synchronization signal 1, the control signal generating circuit 20 issues a clock signal suspend command signal CKS1 as a clock signal suspend command signal CKS2 in synchronization with the rise of the horizontal synchronization signal 1 (FIG. 3C). In the diagram, the clock signal supply control signal 2 means the clock signal suspend command signal CKS1 when it is at Low level, and the clock signal supply control signal 4 means the clock signal suspend command signal CKS2 when it is at Low level.

The clock signal cutoff circuit 80 cuts off the clock signal 9a immediately after receiving the clock signal suspend command signal CKS2, and suspends clock signal supply into the integrated memory 50 (FIG. 3D). The integrated memory 50 shifts to suspending state when clock signal supply is suspended (FIG. 3J). When suspending the clock signal supply, it is always necessary to shifts the integrated memory 50 to idling state by NOP command, but in this embodiment, since the integrated memory 50 is already set in idling state by NOP command, no problem occurs if the clock signal supply is suspended right after input of clock signal suspend command signal CKS2.

Since the select signal 5 changes to Low level simultaneously with output of the clock signal suspend command signal CKS2, the command selector 40 selects the output signal of the POS command generating circuit 30 (FIG. 3F), and issues it to the integrated memory 50. At this time, the memory operation command 3 input in the command selector 40 and the output signal of the POS command generating circuit 30 are NOP commands (FIG. 3G, H). Therefore, the NOP command keeps being issued to the integrated memory 50 (FIG. 3I). The control signal generating circuit 20 sets both clock signal suspend command signal CKS2 and POS start signal 6 simultaneously to Low level (FIG. 3E). Thus, by suspending the clock signal supply, the power consumption in idling state of the system LSI 55 is saved.

3) Finally, the clock signal supply restarting operation is described.

When the clock signal supply command signal CKA1 is input to the control signal generating circuit 20 at timing asynchronous to the horizontal synchronization signal 1, the circuit 20 makes the clock signal supply command CKA1 synchronize with the rise of the horizontal synchronization signal 1 and issues a clock signal supply command signal CKA2 as the result. (FIG. 3C). In the diagram, the clock signal supply control signal 2 means the clock signal supply command signal CKA1 when it is at High level, and the clock signal supply control signal 4 means the clock signal supply command signal CKA2 when it is at High level.

The clock signal cutoff circuit 80 passes the clock signal 9a immediately after receiving the clock signal supply command signal CKA2, and starts supply of clock signal 9b into the integrated memory 50 (FIG. 3D). The integrated memory 50 shifts to idling state along with restart of clock signal supply (FIG. 3J). At this time, the memory control signal 8 is the NOP command issued by the POS command generating circuit 30 (FIG. 3I).

The control signal generating circuit 20 sets the POS start signal 6 at High level in a specified time after output of the clock signal supply command signal CKA2 (FIG. 3E). The POS command generating circuit 30, receiving the POS start signal as a sign, issues a POS command (FIG. 3H). The integrated memory 50 is initialized according to the POS command supplied through the command selector 40 (FIGS. 3I, J). After output of POS command, the POS command generating circuit 30 issues a NOP command, and shifts the integrated memory 50 to idling state.

Thus, after the clock signal supply is restarted and the memory is initialized, the control signal generating circuit 20 changes the select signal 5 to High level on the basis of the horizontal synchronization signal giving the restart timing of clock signal supply. The command selector 40 changes over to select the memory operation command 3 according to the select signal 5. At this time, the memory operation command 3 and POS command 7 input in the command selector 40 are both NOP commands (FIGS. 3G, H). Therefore, the NOP command keeps being issued to the integrated memory 50 even if the signal to be selected is changed over (FIG. 3I).

The operation command is issued on the basis of the next horizontal synchronization signal of the horizontal synchronization signal giving the timing of clock signal supply command signal CKA2, and the integrated memory 50 begins to read out or write in the data.

As described in detail herein, according to the memory controller of the invention, without breaking down the elements of the integrated memory, the power consumption in idling state of the system LSI 55 is saved.

In this embodiment, at the time of input of horizontal synchronization signal, since it is guaranteed that the integrated memory is always in idling state, after the input of horizontal synchronization signal, clock signal supply into the integrated memory is stopped immediately. However, considering a higher safety, it may be also possible to suspend the clock signal supply during a specified time after an output of NOP command.

INDUSTRIAL APPLICABILITY

Thus, according to the memory controller of the invention, in the system LSI integrating a memory, (1) Considering the logical state of the integrated memory, the clock signal supply can be suspended without breaking down the integrated memory.

(2) By suspending the clock signal supply, power consumption of the integrated memory in idling state can be saved.

What is claimed is:

1. A memory controller for controlling a memory comprising:
a control signal generating circuit for synchronizing input clock signal suspend command signal and clock signal supply command signal with a reference signal, and issuing them respectively as synchronized suspend command signal and synchronized supply command signal;

a clock signal cutoff circuit for receiving said synchronized suspend command signal and suspending clock signal supply into said memory, and receiving said synchronized supply command signal to start clock signal supply into said memory;

an operation command generating circuit for receiving said synchronized suspend command signal and synchronized supply command signal, and issuing operation commands to said memory;

a power on sequence (POS) command generating circuit for issuing a POS command according to POS start signal from said control signal generating circuit; and a command selector for selecting one of said operation commands and said POS command and outputting the selected command to said memory, according to a select signal synchronized with one of said synchronized suspend command signal and said synchronized supply command signal.

2. The memory controller as defined in claim 1,
wherein said clock signal cutoff circuit suspends clock signal supply when said memory is in idling state.

3. The memory controller as defined in claim 2,
wherein said operation command generating circuit issues a no operation (NOP) command by receiving said synchronized suspend command signal, and then said clock signal cutoff circuit suspends clock signal supply.

4. The memory controller as defined in claim 1,
wherein said control signal generating circuit changes over the select signal at least before generation of said POS command.

5. The memory controller as defined in claim 1,
wherein said POS command generating circuit issues a NOP command after completion of generation of said POS command, and
said control signal generating circuit changes over the select signal at the time of output of NOP command after completion of generation of said POS command.

6. The memory controller as defined in claim 1,
wherein said memory is a memory having a logical state.

7. The memory controller as defined in claim 1,
wherein said memory is integrated in a semiconductor having said memory controller.

8. The memory controller as defined in claim 1, wherein the reference signal is one of a horizontal synchronization signal and a signal synchronized with the horizontal synchronization signal.

9. A memory control method for controlling a memory comprising the steps of:

(a) synchronizing an input clock signal suspend command signal with a reference signal to obtain a synchronized suspend command signal, and outputting the synchronized suspend command signal;

(b) synchronizing an input clock signal supply command signal with a reference signal to obtain a synchronized supply command signal, and outputting the synchronized supply command signal;

(c) outputting a power on sequence (POS) start signal synchronized with the reference signal;

(d) outputting a select signal synchronized with one of said synchronized suspend command signal and said synchronized supply command signal;

(e) suspending clock signal supply to said memory responsive to the synchronized suspend command signal;

(f) starting clock signal supply to said memory responsive to the synchronized supply command signal;

(g) outputting an operation command to said memory responsive to one of the synchronized suspend command signal and the synchronized supply command signal;

(h) outputting a POS command responsive to the POS start signal; and (i) outputting one of the operation commands and the POS command to said memory responsive to the select signal.

10. The memory control method as defined in claim 9,
wherein at said step (e), the clock signal supply is suspended when said memory is in idling state.

11. The memory control method as defined in claim 10, further comprising:

(j) receiving said synchronized suspend command signal and issuing a NOP command, between said step (a) and said step (e).

12. The memory control method as defined in claim 9,
wherein the reference signal is one of a horizontal synchronization signal and a signal synchronized with the horizontal synchronization signal.

* * * * *